US006753016B2

(12) United States Patent
Ghosh

(10) Patent No.: US 6,753,016 B2
(45) Date of Patent: Jun. 22, 2004

(54) PRESERVATION OF WOOD PRODUCTS

(75) Inventor: Tirthankar Ghosh, Oreland, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/163,789

(22) Filed: Jun. 6, 2002

(65) Prior Publication Data

US 2003/0086979 A1 May 8, 2003

Related U.S. Application Data

(60) Provisional application No. 60/302,834, filed on Jul. 3, 2001.

(51) Int. Cl.[7] ........................ A01N 59/16; A01N 59/00; A01N 55/02; A01N 59/14; A01N 43/80

(52) U.S. Cl. ....................... 424/604; 424/613; 424/614; 424/615; 424/616; 424/646; 424/647; 424/648; 424/DIG. 10; 424/DIG. 11; 514/184; 514/185; 514/186; 514/188; 514/372; 514/373; 514/502; 514/574

(58) Field of Search ................................ 424/646–648, 424/613–616, DIG. 10, DIG. 11

(56) References Cited

U.S. PATENT DOCUMENTS

| | | | | |
|---|---|---|---|---|
| 4,007,312 A | * | 2/1977 | Stofko et al. | 428/420 |
| 4,752,297 A | | 6/1988 | Leach | 8/402 |
| 5,141,753 A | | 8/1992 | Virtanen et al. | |
| 5,470,614 A | | 11/1995 | Chen et al. | |
| 2002/0004951 A1 | | 1/2002 | Auger | |

FOREIGN PATENT DOCUMENTS

| | | | |
|---|---|---|---|
| EP | 0904905 A2 | | 3/1999 |
| EP | 1034903 A1 | | 9/2000 |
| WO | 98/54398 | * | 12/1998 |

OTHER PUBLICATIONS

Chemical Abstract5s 125:278963 (1996).*
Chemical Abstracts 85:162264 (1976).*
"A Quantitative Weathering Study of Wood Surfaces Modified by Chromium VI and Iron III Compounds," P.D. Evans and K.J. Schmalzl; Holzforschung, vol. 43, pp 289–292 (1989).

* cited by examiner

*Primary Examiner*—John Pak
(74) *Attorney, Agent, or Firm*—Kenneth Crimaldi; Thomas J. Howell

(57) ABSTRACT

A method for the protection of wood and other wood materials without affecting dimensional stability or surface integrity of the treated material is described. The method involves treating wood material with an iron salt and selected oxidants where the iron salt is preferably complexed with organic chelating ligands. Preferably, a microbicidal agent is also incorporated into the method to provide treated wood products that demonstrate excellent surface integrity, dimensional stability and retention of the infused microbicidal agents for extended periods of time without incurring the detrimental environmental effects of conventional chromium or copper-based inorganic salt preservation methods.

22 Claims, No Drawings

PRESERVATION OF WOOD PRODUCTS

CROSS REFERENCE TO RELATED PATENT APPLICATIONS

This is a non-provisional application of prior pending U.S. provisional application Ser. No. 60/302,834 filed Jul. 3, 2001.

BACKGROUND

The present invention involves the chemical treatment of wood materials. More specifically, the invention involves a method of treating wood materials with iron salts and an oxidant to maintain dimensional stability and surface integrity of the wood material. Optionally, microbicidal and pesticidal agents may be incorporated to control contamination and degradation of the treated materials by microorganisms and pests.

Preservation of wood materials has long been of interest to mankind; however, chemicals that were found to provide the best preservative properties often posed a significant hazard to the environment. Various water-soluble salts have been used to provide wood preservative properties, such as borax, copper and chromium salts, zinc chlorides, mercuric chloride, nickel salts, sodium fluoride and sodium fluorosilicate. These salts offer the advantages of protection against both fungi and insect infestation, ease of handling (due to the ability to transport in solid form), and susceptibility to later treatment with paints or fire retardants.

Unfortunately, wood treated with these types of water-soluble inorganic salts are susceptible to leaching of the preservatives out of the wood with consequent contamination of the surrounding environment, and the treated wood becomes susceptible to microbial or insect attack over time as salt concentration decreases in the treated wood. Chromium salts are relatively resistant to leaching because these salts form complexes with materials in the wood.

Chromated-copper-arsenic (CCA) compositions are used in the conventional treatment of wood products. The arsenic provides protection from insects (such as termites), the copper provides fungicidal activity, and the chromium(VI) species forms stable compounds with the copper and arsenic that are leach resistant. Hence, CCA acts as a preservative and also protects the wood surface from softening when exposed to sun and rain. However, chromium and arsenic salts are highly toxic and any leaching action contaminates the surrounding environment.

Weathering studies of wood surfaces treated with aqueous solutions of chromium trioxide and ferric salts (nitrate, chloride) showed that the iron(III) treatments caused significant weight and strength loss in the treated wood samples compared to conventional chromium(VI) treatment and that treatment of wood with ferric chloride does not have a protective effect: "A Quantitative Weathering Study of Wood Surfaces Modified by Chromium VI and Iron III Compounds," P. D. Evans and K. J. Schmalzl; Holzforschung, Volume 43, pp 289–292 (1989).

EP 1,034,903 discloses the treatment of wood by impregnation with a mixture of lignin (and/or lignin derivatives) and metal compounds (preferably copper) as an improved method for reducing the leaching of metal components from the treated wood; the reaction products of the lignin (lignin derivatives) and the metal compound are fixed into the wood substrate by macromolecularization or oxidation.

Unlike water-soluble salts, organic chemicals used to treat wood do not tend to leach out of treated lumber to a significant extent over time; however, organic wood preservatives present other problems. Although organic chemical preservatives, such as pentachlorophenol or creosotes, are effective as biocidal agents that prevent infestation by wood-degrading microorganisms and insects, these materials are generally toxic, generate objectionable odors and do not provide satisfactory surface integrity (hardness) to the treated wood.

Most chemicals in use today for wood preservation, whether aqueous or organic, are highly toxic to a broad spectrum of microorganisms. Wood treated with these traditional chemicals, such as CCA or creosote, pose a serious threat to the environment through either leaching or the need for later special disposal procedures.

The present invention seeks to improve upon the prior art wood treatment methods by a providing a treatment that is not toxic to higher organisms, does not leach active ingredient out of impregnated wood materials significantly over time, yet effectively maintains the dimensional stability and surface integrity of the treated wood materials, while preferably also protecting the treated materials from degradation by microorganisms.

STATEMENT OF INVENTION

The present invention provides a method for treatment of wood material comprising (a) contacting wood material with an aqueous treatment solution comprising an iron salt and an oxidant to provide impregnated wood material, and (b) separating the impregnated wood material from the aqueous treatment solution.

In another embodiment the present invention provides the aforementioned method wherein the aqueous treatment solution of step (a) further comprises a 3-isothiazolone selected from one or more of 2-n-octyl-3-isothiazolone and 4,5-dichloro-2-n-octyl-3-isothiazolone.

In a further embodiment the present invention provides a method for microbicidal treatment of wood material comprising (a) contacting the wood material with a first aqueous treatment solution comprising an iron salt and an microbicidal agent to provide impregnated wood material, (b) removing residual first aqueous treatment solution from the impregnated wood material, (c) further contacting the impregnated wood material with a second aqueous treatment solution comprising an oxidant to provide further impregnated wood material, and (d) separating the further impregnated wood material from the second aqueous treatment solution. In a preferred embodiment, the present invention provides the latter method further comprising subjecting the impregnated wood material to a pressure treatment during one or more of step (a) and step (c).

DETAILED DESCRIPTION

We have discovered that wood and other wood materials may be treated to maintain dimensional stability and surface integrity for extended periods of time after exposure to UV light and water without the use of conventional chromium (VI) salts by treatment with an iron salt and an oxidant for at least 15 seconds at temperatures from 15° C. and 100° C. This discovery also allows further protection of wood materials from attack by microorganisms by incorporating a microbicidal agent into the aforementioned treatment process that results in retention of the microbicidal agent in the treated wood for extended periods of time. In most cases, the oxidant may be added before, during or after the wood material has been contacted with the iron salt; however, in situations where the iron salt and oxidant may interact rapidly with each other during treatment, the oxidant is preferably added after the wood material has been impregnated with iron salt or iron salt and microbicidal agent.

As used herein, the following terms have the designated definitions, unless the context clearly indicates otherwise. All percentages referred to will be expressed in weight percent (%), based on total weight of polymer or composition involved, unless specified otherwise. The following abbreviations are used herein: g=grams, L=liters, mm=millimeters, cm=centimeters, pressure is in kiloPascals (kPa). Unless otherwise specified, ranges listed are to be read as inclusive and combinable and temperatures are in degrees Celsius (° C.).

As used herein, "wood," "wood material" and "wood substrate" shall mean all forms of wood, for example, solid wood (such as timber or lumber in the form of logs, beams, planks, sheets and boards), wood composite materials (such as wood fiber board, chip board and particle board) and all products made from wood and wood-composite materials (such as mill frames, decking, siding, siding cladding, roof shingles and utility poles).

As used herein, "surface integrity" shall refer to the property of the wood materials and resultant treated wood materials related to hardness and impenetrability, that is, resistance to deformation and softening of the wood surface. As used herein, "dimensional stability" shall refer to the property of the wood materials and resultant treated wood materials related to resistance to swelling, warping or splitting of the wood product. The term "microbicide" refers to a compound capable of inhibiting the growth of or controlling the growth of microorganisms at a locus; microbicides include, for example bactericides, fungicides and algaecides.

The iron salts, oxidants and microbicidal agents may be incorporated into the wood materials by treatment methods that contact the wood substrate with aqueous solutions, emulsions or suspensions of the aforementioned ingredients, either in combination or individually added in any order. Suitable methods of contact include, for example, brushing, spraying, dipping, pressure and other similar treatments. Preferably, application of ingredients to wood substrates are by pressure treatment.

A suitable treatment method involves soaking (dipping) the wood or other wood material in an aqueous solution of iron salts, microbicidal agents and oxidizing agent at temperatures ranging from 15 to 100° C. and preferably from 20 to 50° C. The treated material is then removed from the treatment solution and allowed to dry.

As used herein, "dipping" shall mean impregnation of the wood material with various active ingredients by soaking the wood product in an aqueous solution of the desired active ingredients. The soaking step may modified by other types of treatment (for example, see pressure-treatment described below), that is, the treated wood product may be drained free of excess treatment solution and treated or retreated multiple times with fresh treatment solution. Alternatively, the treated wood product may be removed from the treatment solution and subjected to a drying step prior to any further treatment (dipping or pressure treatment).

Impregnation of the iron salts and microbicidal agents into the wood materials may be accomplished by use of an aqueous carrier solution. Typically the iron salt and microbicidal agent may be added together or they may be introduced into the treatment cycle at different points in any order. Preferably, the iron salt or iron salt/microbicidal agent solution is an aqueous solution.

The soaking of wood and other wood materials can be done at standard pressure, by use of vacuum-pressure cycles, pressure or other standard wood preservation processes. Use of vacuum-pressure or pressure techniques reduces treatment time and increases the level of penetration of the iron salt/microbicidal agent into the wood products, thereby increasing the effectiveness of the preservative treatment. Preferably the treatment is conducted by subjecting the impregnated wood material to a pressure treatment during contact of the wood material with the aqueous treatment solution.

The present invention provides a simple, safe, and relatively inexpensive method of wood preservation. Wood to be treated by the method of the present invention may have a moisture content varying from dry to green, that is, moisture contents ranging from less than 20% and up to 100%. Impregnation of the iron salt or iron salt/microbicidal solution is more effective when done on dry wood, preferably with a moisture content of less than 20%. However, it is not required that the wood be dried before treatment.

Iron salts (ferrous or ferric) suitable for use in the present invention include, for example, chloride, bromide, fluoride, iodide, nitrate, borate, phosphate, pyrophosphate, carbonate, sulfate and titanate salts. Other suitable iron salts include organic acid salts, such as acetate, formate, propionate, stearate, benzoate, citrate, D-gluconate, lactate and tartrate. Optionally, the iron salts may be "mixed" salts of any of the aforementioned anionic counterions. Preferably, the iron salt is selected from one or more of chloride, bromide, nitrate and sulfate salts.

Additional suitable iron salts include those salts formed by interaction with organic compounds, such as complexed or chelated iron salts. Suitable organic ligands that form complexes or chelates with ferric or ferrous ions include, for example, aromatic amines (such as 2,2'-bipyridine or 2,2'-dipyridyl, 1,10-phenanthroline and naphthyridine), polyamines (such as ethylenediamine and diethylenetriamine) and anionic nucleophilic compounds (such as acetylacetonate, oxalate, catecholate, thiophenoxide, cyanide ($CN^-$), nitrilotriacetic acid and salts thereof, and ethylenediaminetetraacetic acid and salts thereof). Preferably, the organic ligand is selected from one or more of 2,2'-dipyridyl and ethylenediaminetetraacetic acid salt.

For the aqueous iron salt or iron salt/microbicidal agent solutions, the concentration of iron salts in the water is typically from 0.1 to 10% and preferably from 0.5 to 5%. Choice of iron concentration may depend on a variety of factors, including the species, size, type, form and other characteristics of the wood or wood product to be treated as well as the intended end use of the treated material.

The wood product material may be treated initially with a solution containing both iron salt and oxidant; this is conveniently done when there is little or no immediate chemical interaction between the iron salt and the oxidant used, such as when the iron is in complexed form or when the oxidant is not a strong oxidant. However, the wood product material is preferably treated in a first stage that allows complete penetration by the iron salt or iron salt/microbicidal agent mixture throughout the entire body of the wood substrate before contact with an oxidant, where the impregnated wood material is freed of residual aqueous treatment solution and then treated with the oxidant. In this case, impregnation of the iron salt into the wood material is substantially complete before the iron has been oxidized by the oxidant.

Typically, the wood material is removed from the iron salt or salt/microbicidal agent solution after soaking (dipping) by either draining away the residual treatment solution or removing the treated wood from the solution and allowing it to "drip-dry." A vacuum may also be applied to the treated material in order to remove the excess treatment solution. After this first-stage treatment, the wood is further contacted with an oxidant solution in a second-stage treatment. The treated material is then finally removed from the treatment solution and may be dried at room temperature and atmospheric pressure or by kiln drying.

The amount of time the wood material is permitted to soak is determined by the dimensions, dryness, and type of wood material to be treated. In the case of treatment with an aqueous solution of iron salt/microbicidal agent, a treatment time of at least 15 seconds is typically required, preferably from 30 seconds to 48 hours, and more preferably from 1 minute to 1 hour. Other impregnation techniques may be applied during the treatment step to increase the penetration of iron salts into the material, and at the same time, decrease the time needed to achieve maximum penetration. Some of the known techniques include pressure impregnation and vacuum soaking. Pressure and vacuum-pressure techniques are often preferred for wood pieces with large cross-sections, for example greater than about 5 cm (2 inches) and up to about 60 cm in diameter.

The temperature of the aqueous treatment solution can be from 15 to 100° C., preferably from 20 to 50° C., and more preferably from 25 to 40° C. Treatment at higher temperatures promotes diffusion of the iron salt into the wood material; however, temperatures above about 50° C. may result in some decomposition of the wood product.

Suitable oxidants for use in the present invention include, for example, peroxides (such as hydrogen peroxide), persulfate (peroxysulfate), chlorate, hypochlorite, iodate, periodate, bromate, ozone, peroxyacetic acid and hydroperoxides (such as tert-butyl hydroperoxide). Hydrogen peroxide may be provided by using a solution of hydrogen peroxide directly, or a peroxide 'precursor,' such as perborate or percarbonate. The oxidants are conveniently provided as aqueous solutions or solids and are typically incorporated into the treatment solution for use in the present invention at levels of 1 to 30%, preferably from 2 to 20% and more preferably from 3 to 10%, based on weight of the treatment solution. Hydrogen peroxide may be provided in the form of dilute aqueous solutions, typically having a hydrogen peroxide content of 1 to 30 percent by weight of aqueous solution; perborate is typically provided in the form of solid sodium perborate in hydrate form; percarbonate may be provided as solid sodium percarbonate in hydrate form, which is an adduct of sodium carbonate and hydrogen peroxide. Preferably, the oxidant is selected from one or more of hydrogen peroxide and persulfate.

Optional treatments include addition of one or more of the following adjuvants during the treatment process: surfactants (typically in an amount of 0.1–1%), cosolvents (typically in an amount of 0.1–1%), dispersants (typically in an amount of 0.1–1%), defoamers (typically in an amount of 10–1000 ppm), corrosion inhibitors (typically in an amount of 100–1000 ppm), wax (typically in an amount of 0.1–1%), water-repellent polymer agents (such as copolymers of styrene/2-ethylhexyl acrylate/N-methylolacrylamide/methacrylic acid; butyl acrylate/styrene/acrylic acid/acrylamide; butyl acrylate/styrene/hydroxyethyl methacrylate/acrylamide/methacrylic acid; vinyl acetate/butyl acrylate; and long chain alkyl (meth)acrylate copolymers, such as described in EP 1,048,422-A), and fire retardants (such as phosphoric acid salts, sulfuric acid salts, carbonates, borates, nitrates, chlorides, bromides, typically in a amount of 0.01 to 90%, preferably 1 to 50%). All concentrations given above refer to weight percent of the ingredient on wood.

For some applications, additional optional ingredients may be included in the method of the present invention. For example one or more microbicidal agents and pesticidal agents may be added to the treatment solutions used in the method of the present invention, thereby providing additional advantages and effectiveness. When treatment solutions containing microbicides (such as algaecides, bactericides, fungicides and marine antifouling agents) or pesticides (such as insecticides) are employed, the proportions that are used will depend upon the relative efficacy of compounds in the mixture with respect to the amount of wood material to be treated and the targeted condition or pests to be controlled. Preferably the micobicidal agent is selected from one or more of 3-isothiazolones and fungicides. Examples of microbicides and pesticides which can be used in the method of the present invention include:

(a) general microbicides such as, for example, 3-isothiazolones, 3-iodo-2-propynylbutylcarbamate, 1,2-dibromo-2,4-dicyanobutane, methylene-bis-thiocyanate (MBT), 2-thiocyano-methylthiobenzothiazole, tetrachloroisophthalo-nitrile, 5-bromo-5-nitro-1,3-dioxane, 2-bromo-2-nitropropane-1,3-diol, 2,2-dibromo-3-nitrilopropionamide (DBNPA), N,N'-dimethylhydroxyl-5,5'-dimethyl-hydantoin, bromochlorodimethylhydantoin, 1,2-benzisothiazolin-3-one, 4,5-tri-methylene-2-methyl-3-isothiazolone, 5-chloro-2-(2,4-dichlorophenoxy)-phenol, 3,4,4'-trichlorocarbanilide, copper naphthenate, copper-8-hydroxy-quinoline, zinc borate, boric acid, trimethyl boron, zinc oxide, glutaraldehyde, 1,4-bis(bromo-acetoxy)-2-butene, 4,5-dichloro-1,1-dithiacyclopentene-3-one, chlorothalonil and quaternary ammonium based compounds.

(b) fungicides such as, for example, zinc dimethyl dithiocarbamate, 2-methyl-4-t-butylamino-6-cyclopropylamino-s-triazine, 2,4,5,6-tetrachloroisophthalonitrile, N,N-dimethyl dichlorophenyl urea, copper thiocyanate, N-(fluorodichloromethylthio)phthalimide, N,N-dimethyl-N'-phenyl-N'-fluorodichloromethylthiosulfamide; copper, sodium and zinc salts of 2-pyridinethiol-1-oxide; tetramethylthiuram disulfide, 2,4,6-trichlorophenyl-maleimide, 2,3,5,6-tetrachloro-4-(methylsulfonyl)-pyridine, diiodomethyl p-tolyl sulfone, phenyl (bispyridil) bismuth dichloride, 2-(4-thiazolyl)-benzimidazole, pyridine triphenyl borane, phenylamides, halopropargyl compounds, propiconazole, cyproconazole, tebuconazole and 2-haloalkoxyaryl-3-isothiazolones (such as 2-(4-trifluoro-methoxyphenyl)-3-isothiazolone, 2-(4-trifluoromethoxy-phenyl)-5-chloro-3-isothi-azolone and 2-(4-trifluoromethoxyphenyl)-4,5-dichloro-3-isothiazolone).

(c) agricultural fungicides such as, for example, dithiocarbamate and derivatives such as ferbam, ziram, maneb (manganese ethylenebisdithio-carbamate), mancozeb, zineb (zinc ethylenebisdithiocarbamate), propineb, metham, thiram, the complex of zineb and polyethylene thiuram disulfide, dazomet, and mixtures of these with copper salts; nitrophenol derivatives such as dinocap, binapacryl and 2-sec-butyl-4,6-dinitrophenyl isopropyl carbonate; heterocyclic structures such as captan folpet, glyodine, dithianon, thioquinox, benomyl, thiabendazole, vinolozolin, iprodione, procymidone, triadimenol, triadimefon, bitertanol, fluoroimide, triarimol, cycloheximide, ethirimol, dodemorph, dimethomorph, thifluzamide and quinomethionate; miscellaneous halogenated fungicides such as: chloranil, dichlone, chloroneb, tricamba, dichloran and polychloronitrobenzenes; fungicidal antibiotics such as: griseofulvin, kasugamycin and streptomycin; miscellaneous fungicides such as diphenyl sulfone, dodine, methoxyl, 1-thiocyano-2,4-dinitrobenzene, 1-phenyl-thiosemicarbazide, thiophanate-methyl and cymoxanil; acylalanines such as furalaxyl, cyprofuram, ofurace, benalaxyl, and oxadixyl; fluazinam, flumetover, phenylbenzamide derivatives such as those disclosed in EP 578,586-A, amino acid derivatives such as valine derivatives disclosed in EP 550,788-A, methoxyacrylates such as methyl (E)-2-(2-(6-(2-cyanophenoxy)pyrimidin-4-yloxy)phenyl)-3-methoxyacrylate, benzo(1,2,3)thiadia-zole-7-carbothioic acid S-methyl ester, propamocarb, imazalil, carbendazim, myclobutanil, fenbu-conazole, tridemorph, pyrazophos, fenarimol, fenpiclonil and pyrimethanil.

(d) insecticides such as, for example, acephate, aldicarb, α-cypermethrin, azinphos-methyl, bifenthrin, binapacryl, buprofezin, carbaryl, carbofuran, cartap, chlorpyrifos, chlorpyrifos methyl, clofentezine, cyfluthrin, cyhexatin, cypermethrin, cyphenothrin, deltamethrin, demeton, demeton-S-methyl, demeton-O-methyl, demeton-S, demeton-S-methyl sulfoxid, demephion-O, demephion-S, dialifor, diazinon, dicofol, dicrotophos, diflubenzuron, dimethoate, dinocap, endosulfan, endothion, esfenvalerate, ethiofencarb, ethion, ethoate-methyl, ethoprop, etrimfos, fenamiphos, fenazaflor, fenbutatin-oxide, fenitrothion, fenoxycarb, fensulfothion, fenthion, fenvalerate, flucycloxuron, flufenoxuron, fluvalinate, fonofos, fosmethilan, furathiocarb, hexythiazox, isazophos, isofenphos, isoxathion, methamidophos, methidathion, methiocarb, methomyl, methyl parathion, mevinphos, mexacarbate, monocrotophos, nicotine, omethoate, oxamyl, parathion, permethrin, phorate, phosalone, phosmet, phosphamidon, pirimicarb, pirimiphos-ethyl, profenofos, promecarb, propargite, pyridaben, resmethrin, rotenone, tebufenozide, temephos, TEPP, terbufos, thiodicarb, tolclofos-methyl, triazamate, triazophos and vamidothion.

In the case of the optional use of microbicidal agents, these are typically added in amounts of 0.02–1% (approximately 2–120 grams per cubic foot of wood) and preferably 0.1–1% (approximately 12–120 grams per cubic foot of wood) by weight on wood, and are added to protect wood from rotting and fungal attack.

Preferably, the microbicidal agents are 3-isothiazolones of the Formula I:

(I)

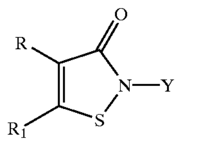

wherein:

Y is an unsubstituted or substituted ($C_1$–$C_{18}$)alkyl group, an unsubstituted or substituted ($C_2$–$C_{18}$)alkenyl or alkynyl group, an unsubstituted or substituted ($C_6$–$C_{12}$) cycloalkyl group, an unsubstituted or substituted ($C_7$–$C_{10}$)aralkyl group, or a substituted ($C_7$–$C_{10}$)aryl group;

R and $R_1$ are independently hydrogen, halogen or ($C_1$–$C_4$) alkyl groups; or R and $R_1$ can be taken together with the C═C double bond of the isothiazolone ring to form an unsubstituted or substituted benzene ring.

By a "substituted alkyl group" is meant an alkyl group having one or more of its hydrogens replaced by another substituent group; examples include hydroxyalkyl, haloalkyl and alkylamino. By a "substituted aralkyl group" is meant an aralkyl group having one or more of its hydrogens on either the aryl ring or the alkyl chain replaced by another substituent group; examples include halo, ($C_1$–$C_4$)alkyl, halo-($C_1$–$C_4$)alkoxy and ($C_1$–$C_4$)alkoxy. By a "substituted aryl group" is meant an aryl group, such as phenyl, naphthyl or pyridyl groups, having one or more of its hydrogens on the aryl ring replaced by another substituent group; examples include halo, nitro, ($C_1$–$C_4$)alkyl, halo-($C_1$–$C_4$)alkoxy and ($C_1$–$C_4$)alkoxy.

Suitable 3-isothiazolone compounds include, for example, 2-methyl-3-isothiazolone, 2-methyl-5-chloro-3-isothiazolone and other 2-($C_1$–$C_5$)alkyl-3-isothiazolone derivatives. Preferably, the 3-isothiazolone compound is a 3-isothiazolone of formula I, where Y is an unsubstituted or substituted ($C_6$–$C_{18}$)alkyl group, or an unsubstituted or substituted ($C_6$–$C_{18}$)alkenyl or alkynyl group. Preferably, the 3-isothiazolone is selected from 2-n-octyl-3-isothiazolone, 4,5-dichloro-2-n-octyl-3-isothiazolone (DCOIT), 4,5-dichloro-2-benzyl-3-iso-thiazolone, 2-cyclohexyl-3-isothiazolone, 2-benzyl-3-isothiazolone and 2-haloalkoxyaryl-3-isothiazolones (such as 2-(4-trifluoromethoxyphenyl)-3-isothiazolone, 2-(4-trifluoromethoxyphenyl)-5-chloro-3-isothiazolone and 2-(4-tri-fluoromethoxyphenyl)-4,5-dichloro-3-isothiazolone). More Preferably, the 3-isothiazolone is selected from one or more of 2-n-octyl-3-isothiazolone and 4,5-dichloro-2-n-octyl-3-isothiazolone.

Some embodiments of the invention are described in detail in the following Examples. All ratios, parts and percentages are expressed by weight unless otherwise specified, and all reagents used are of good commercial quality unless otherwise specified. Abbreviations used in the Examples and Tables are listed below with the corresponding descriptions.

| | | |
|---|---|---|
| SYP | = | Southern Yellow Pine |
| CCA | = | Copper-Chromium-Arsenic |
| DCOIT | = | 4,5-Dichloro-2-n-octyl-3-isothiazolone |
| DIPY | = | 2,2'-Dipyridyl |
| PAS | = | Photoacoustic Spectroscopy |
| FTIR | = | Fourier Transform Infrared Spectroscopy |
| kPa | = | KiloPascals |

EXAMPLE 1

Wood wafers (7.6 cm [3 inch]×3.8 cm [1.5 inch]×0.6 cm [0.25 inch]) made from southern yellow pine (SYP) were used as substrates for screening tests on treatment efficacy. The different chemicals were introduced into the wood by a "dip" treatment, with and without additional pressure treatment (see Methods A-D described below).

Comparative: SYP wafers commercially pressure-treated with CCA were included for comparison purposes and placed in a weatherometer for 500 hours exposure along with other treated wood samples described below.

Method-A: (iron/peroxide oxidant, 2-step) Six SYP wafers were immersed in an aqueous solution of 5% $FeCl_3 \bullet 6H_2O$ for 30 seconds. The wafers were removed and dried at room temperature for 30 minutes. Two of the wafers were then immersed in an aqueous solution of 5% $H_2O_2$ solution for 30 minutes, similarly, two wafers were immersed in an aqueous solution of 1% $H_2O_2$ and the remaining two were not treated with $H_2O_2$ solution. The wafers were then air dried for 24 hours and placed in a weatherometer for 500 hours exposure.

Method-B (iron/iodic acid oxidant, 1-step) To a 100 g solution of 5% $FeCl_3 \bullet 6H_2O$ was added 2 g of a 50% iodic acid ($HIO_3$) solution; a white precipitate was formed. To this mixture was added 5 ml of a 36% HCl solution to provide a clear, precipitate-free solution. Four SYP wafers were immersed into this solution for 30 seconds. The wafers were removed and dried at room temperature for 48 hours; the wafers were brown in color after treatment. Two of the treated wafers were then air dried for 24 hours and placed in a weatherometer for 500 hours exposure.

Method-C (iron/persulfate oxidant, 1-step) To a 100 g solution of 2% $FeCl_3 \bullet 6H_2O$ was added 5 g of solid persulfate complex (molar ratio of 2 parts $KHSO_5$ plus 1 part $KHSO_4$ plus 1 part $K_2SO_4$, available as Oxone™ oxidant from DuPont Co.). Concentrated HCl was added to adjust the final pH to 1.1. Four SYP wafers were immersed into this solution for 30 seconds then air dried for 24 hours and placed in a weatherometer for 500 hours exposure. A "two-step" variation similar to that described for Method-A was also conducted with the persulfate complex oxidizing agent.

Method-D (complexed iron/peroxide oxidant, 2-step (pressure/pressure or pressure/dip), with/without microbicidal agent) A 3.8-L (1-gallon) Parr™ pressure vessel was equipped to accommodate pressure and vacuum cycles and 12 SYP wafers weighted-down with stainless steel anchors were placed in the pressure reactor. Liquid (aqueous solution containing 2% $FeCl_2$ and 0.2% DIPY) was introduced to the vessel by vacuum suction (mild vacuum, approximately 30 kPa) and liquid levels were monitored with conductivity sensors. Liquid level was maintained under pressure (approximately $1\times10^3$ kPa or 150 psig) by using a piston pump to feed additional aqueous solution 2% $FeCl_2$/0.2% DIPY until saturation levels were attained. The wafers were pressure-treated for approximately 90 minutes, typically 30–60 minutes, and then the wafers were removed and dried for 10 days. Four of the treated wafers were placed back in the pressure vessel and subjected to pressure treatment similar to that described above, except using an aqueous solution of 1% $H_2O_2$; four other treated wafers were then subjected to a dip treatment with 1% $H_2O_2$ similar to the second step of Method-A. Other wafers were treated similarly except that the treatment solutions contained added microbicidal agent, 0.15% DCOIT with about 3% emulsifying surfactant (based on weight of solution), in addition to the iron salt, to provide the treatment solution in the form of an emulsion. The wafers were then air dried for 24 hours and placed in a weatherometer for 500 hours exposure.

EXAMPLE 2

The weatherometer was a Carbon Arc Weatherometer (available from Atlas Co.) and exposure conditions included constant irradiation of 0.35 watts/square meter ($W/m^2$) with a 20-minute water spray every 2 hours to introduce humidity (according to ASTM G-26, published by the American Society for Testing and Materials).

Wood surfaces were analyzed for lignin loss after exposure in the weatherometer using photoacoustic spectroscopy/Fourier transform infrared spectroscopy (PAS/FTIR) at a depth of 8, 50 and 75 microns ($\mu$). A Bio-Rad FTS 6000 step-scan spectrometer (Cambridge, Mass., USA), equipped with a water-cooled ceramic mid-infrared source and a KBr crystal beamsplitter, was used with a helium-purged MTEC 300 photoacoustic detector (Ames, Iowa, USA). Data were collected using rapid-scan and step-scan phase modulation frequencies of 40 K, 20 K, 10 K, 2.5 K, 800, 400, 100 and 50 Hz at probing depths of 2.5–71$\mu$ at 1500–2000 $cm^{-1}$. Circular sections (1 cm diameter) were cut from the treated wafer samples (1–2.5 mm thickness and placed into the PAS sampling cells for measurement. The incident beam was set perpendicular to the flat surface of the disc-shaped samples.

The absorption at ~1500 $cm^{-1}$ (1509–1515 $cm^{-1}$) was used as an indicator of the relative amount of lignin remaining on the surface and to provide a qualitative picture of the effectiveness of the different treatments (see Table 1). A rating scale of 1 to 10 was used, with "10" indicating complete retention (100%) of lignin and "1" indicating little or no retention (approximately 10%) of lignin.

From the data in Table 1 we conclude that:

(i) all of the surface lignin in untreated wood undergoes degradation when exposed to UV and water.

(ii) wood treated with CCA retains about 20–40% (at 8–50$\mu$) of the surface lignin after exposure to UV and water, compared to about 100% for unexposed wood.

(iii) wood treated only with Fe(III) salt also retains 20–40% (at 8–50$\mu$) of the surface lignin after exposure (1-1).

(iv) wood treated with Fe(III) followed by either hydrogen peroxide (1-4) or a persulfate/bisulfate/sulfate mixture (1-8, 1–9) showed significant lignin retention (30–70% at 8–50$\mu$) compared to about 10% retention for the control.

TABLE 1

Treatment with Fe(III) and Oxidizing Agent

| Sample ID | Treatment Method | UV/Water Exposure | Relative Lignin Retention on Wood Surface 8.3$\mu$ | 50$\mu$ | 75$\mu$ |
|---|---|---|---|---|---|
| Control | None | no | 10 | 10 | 10 |
| Control | None | yes | 1 | 1 | 1 |
| Comparative | CCA (no iron) | yes | 2 | 4 | 4 |
| 1-1 | A no peroxide | yes | 2–3 | 4 | 5–6 |
| 1-2 | A 5% peroxide (no iron) | yes | 1 | 1 | 1 |
| 1-3 | A 1% peroxide | yes | 2 | 5 | 6 |
| 1-4 | A 5% peroxide | yes | 3 | 6 | 6 |
| 1-5 | B 1% iodic acid | no | 10 | 10 | 10 |
| 1-6 | B 1% iodic acid | yes | 1–2 | 2–4 | 3–6 |
| 1-7 | C 5% persulfate | no | 10 | 10 | 10 |
| 1-8 | C 5% persulfate | yes | 4–5 | 5–6 | 6–7 |
| 1–9 (2-step) | C 5% persulfate | yes | 4 | 7 | 7 |

The effect of pressure on the treatment process is summarized in Table 2. In this case, the iron salt treatment was conducted in a first step under pressure conditions described in Method-D where the second step (oxidant treatment) was conducted by conventional dipping (see Method-A) or under pressure conditions. All the wafers from Method-D treatments had a uniform light reddish brown color on the surface. From the data in Table 2 we conclude that when oxidant is included in the process, results from the pressure/pressure or pressure/dip format of treatment are similar (2-1A versus 2-2A) and that the presence of the optional microbicidal agent does not affect the degree of surface lignin retention.

TABLE 2

Pressure with Complexed Fe(II) + Pressure/No Pressure with Oxidant (Method-D) with 1% Peroxide

| Sample ID | Pressure During Oxidant Treatment | UV/Water Exposure | Relative Lignin Retention on Wood Surface at 8–25μ |
|---|---|---|---|
| 2-1 | No | no | 9 (9*) |
| 2-1A | No | yes | 6 (6*) |
| 2-2 | Yes | no | 10 (9*) |
| 2-2A | Yes | yes | 7 (6*) |

*= included microbicidal agent DCOIT

I claim:

1. A method for treatment of wood material comprising:
(a) contacting wood material with an iron salt and an oxidant in at least one aqueous solution, emulsion or suspension to provide impregnated wood material, wherein the oxidant is at least one of persulfate, perborate and percarbonate, and wherein the wood material is immersed in the at least one aqueous solution, emulsion or suspension; and
(b) separating the impregnated wood material from the at least one aqueous solution, emulsion or suspension.

2. The method of claim 1 wherein the iron salt is at least one of chloride, bromide, nitrate and sulfate salts.

3. The method of claim 1 wherein the iron salt is complexed with at least one of aromatic amine, polyamine and anionic nucleophilic compound.

4. The method of claim 3, wherein the aromatic amine is at least one of 2,2'-dipyridyl, 1,10-phenanthroline and naphthyridine.

5. The method of claim 3, wherein the polyamine is at least one of ethylenediamine and diethylenetriamine.

6. The method of claim 3, wherein the anionic nucleophilic compound is at least one of acetylacetonate, oxalate, catecholate, thiophenoxide, cyanide, nitrilotriacetic acid and salts thereof, and ethylenediaminetetraacetic acid and salts thereof.

7. The method of claim 1 wherein the oxidant is persulfate.

8. The method of claim 1 wherein the al least one aqueous solutions, emulsions or suspensions of step (a) further comprises at least one of microbicidal agent and pesticidal agent.

9. The method of claim 8 wherein the oxidant is contacted with the wood material in step (a) after the wood material has been impregnated with the iron salt and microbicidal agent.

10. The method of claim 9 wherein the impregnated wood material is freed of residual aqueous solutions, emulsions or suspensions prior to treatment with the oxidant.

11. The method of claim 8 wherein the microbicidal agent is at least one of 3-isothiazolones and fungicides.

12. The method of claim 11, wherein the 3-isothiazolone is at least one of 2-n-octyl-3-isothiazolone and 4,5-dichloro-2-n-octyl-3-isothiazolone.

13. The method of claim 8, wherein the pesticidal agent is an insecticide.

14. The method of claim 1 wherein the wood material is contacted with the at least one aqueous solutions, emulsions or suspensions for a period of time of at least 15 seconds.

15. The method of claim 14 wherein the period of time is from 1 minute to 1 hour.

16. The method of claim 1 wherein the wood material is contacted with the at least one aqueous solutions, emulsions or suspensions at a temperature of from 15° C. to 100° C.

17. The method of claim 1 wherein the at least one aqueous solutions, emulsions or suspensions further comprises a water-repellent polymer agent.

18. The method of claim 17, where the water-repellent polymer agent is a long chain alkyl (meth)acrylate copolymer.

19. The method of claim 1 further comprising subjecting the impregnated wood material to a pressure treatment during step (a).

20. The method of claim 1 wherein the wood material is at least one of logs, beams, planks, sheets and boards.

21. A method for microbicidal treatment of wood material comprising:
(a) contacting the wood material with a first aqueous treatment solution comprising an iron salt and a microbicidal agent to provide impregnated wood material;
(b) removing residual first aqueous treatment solution from the impregnated wood material;
(c) further contacting the impregnated wood material with a second aqueous treatment solution comprising an oxidant to provide further impregnated wood material, wherein the oxidant is at least one of persulfate, perborate and percarbonate; and
(d) separating the further impregnated wood material from the second aqueous treatment solution.

22. The method of claim 21 further comprising subjecting the impregnated wood material to a pressure treatment during at least one of step (a) and step (c).

* * * * *